United States Patent
Park

(10) Patent No.: US 8,094,528 B2
(45) Date of Patent: Jan. 10, 2012

(54) METHOD FOR READING MEDIA INFORMATION FROM OPTICAL RECORDING MEDIA

(75) Inventor: Jeong Gyu Park, Incheon-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 1304 days.

(21) Appl. No.: 11/301,252

(22) Filed: Dec. 13, 2005

(65) Prior Publication Data

US 2006/0215523 A1    Sep. 28, 2006

(30) Foreign Application Priority Data

Mar. 23, 2005  (KR) .................. 10-2005-0023989

(51) Int. Cl.
*G11B 7/00* (2006.01)

(52) U.S. Cl. ................. 369/44.26; 369/44.27; 369/47.55

(58) Field of Classification Search .................. None
See application file for complete search history.

(56) References Cited

U.S. PATENT DOCUMENTS

| | | | |
|---|---|---|---|
| 2004/0004912 A1 | 1/2004 | Morishima | |
| 2005/0058044 A1 | 3/2005 | Koegler, III et al. | |
| 2006/0126483 A1* | 6/2006 | Hanks | 369/275.1 |

FOREIGN PATENT DOCUMENTS

| | | |
|---|---|---|
| EP | 1 367 570 | 12/2003 |
| KR | 1994-0004636 | 3/1994 |
| KR | 1999-026340 | 4/1999 |
| KR | 1020010060150 | 7/2001 |
| KR | 10-0310741 | 9/2001 |

OTHER PUBLICATIONS

European Search Report dated Dec. 8, 2006.

* cited by examiner

*Primary Examiner* — Christopher R Lamb
(74) *Attorney, Agent, or Firm* — KED & Associates LLP

(57) ABSTRACT

A method for reading media information from optical recording media is provided which allows media information to be rapidly and stably read from the recording media. Index marks are successively detected at a plurality of positions spaced at predetermined intervals along radial direction of the recording media, and a center position is selected from amongst the positions at which the index marks have been successively detected. Media information read at the selected center position is used to rapidly and accurately perform a recording operation on a label surface of the optical recording media.

25 Claims, 8 Drawing Sheets

METHOD FOR READING MEDIA INFORMATION FROM OPTICAL RECORDING MEDIA

BACKGROUND OF THE INVENTION

1. Field of the Invention

The invention is related to a method for reading media information, and, more particularly, to a method for stably reading media information from optical recording media on which a label may be printed.

2. Description of the Related Art

Optical discs have been developed recently which allow data to be recorded on a data surface of the disc, and a label with a desired design to be printed on a non-data, or label surface opposite the data surface of the disk. Labels are typically transferred onto the label surface of the disc using a laser etching technology commonly referred to as LightScribe, in which a laser burns or etches an image onto a specially prepared, non-data side of a LightScribe optical disc.

A layout of an exemplary label surface of this type of recording media is shown in FIG. 1, and FIG. 2 illustrates a control feature outer ring (CFOR) area located in the control feature zone of the exemplary recording media shown in FIG. 1. The CFOR area includes an index mark indicative of the CFOR area, and media information such as a media ID, in which the media ID is classified by three non-continuous fields and recorded therein.

When data is recorded to a data recording surface of a disc, the data recording surface generates a tracking guide signal, such as a Wobble signal, allowing a tracking servo operation which compensates for eccentricity of the disc to be performed. However, a label surface of an optical disc such as, for example, the LightScribe disc discussed above, is not equipped generate a guide signal, and thus a printing operation on the label surface of the disc may be easily affected by eccentricity of the disc.

In order to print a label on the label surface of this type of recording media, the recording media is inserted into an optical disc drive, and an optical pick-up moves to the CFOR area using the index mark and reads media information such as, for example, media ID, from the CFOR area. The media information, which may include media ID classified by three non-continuous fields, is sequentially read and then transmitted to an external host, such as, for example, a personal computer.

The host compares the transmitted media ID with a media ID stored in a database, and then determines whether the media ID has been normally read from the disc. If any one of the three classified media IDs is not normally read, due to, for example an eccentricity component, the optical pick-up is returned to the CFOR area and the media information is read once again. This process is repeated until the required information is normally read.

There are disadvantages to this method in that, when an operation for reading information from the CFOR area experiences instability due to, for example, an eccentricity component of the recording media, the continuous reading of information from the CFOR area until the required media information is obtained is relatively time consuming, thus delaying a recording operation on the label surface of the recording media.

SUMMARY OF THE INVENTION

An object of the invention is to solve at least the above problems and/or disadvantages and to provide at least the advantages described hereinafter.

Therefore, it is an object of the invention to provide a method for reading media information from optical recording media which is capable of stably reading media information recorded on the label surface of a LightScribe recording media.

It is another object of the invention to provide a method for reading media information from optical recording media which is capable of detecting a position to stably read media information recorded on a label surface of a LightScribe recording media.

In accordance with an embodiment of the invention as broadly described herein, the above and other objects can be accomplished in whole or in part by the provision of a method for reading media information from optical recording media which includes checking whether a data pattern is detected at a plurality of positions spaced at predetermined intervals in the radial direction of a recording media, selecting a position between the positions in which the data pattern is successively detected, and reading media information at the selected position.

In accordance with another embodiment of the invention, there is provided a method for reading media information of optical recording media which includes reading media information at positions at which a data pattern is detected out of a plurality of positions spaced at predetermined intervals in the radial direction of a recording media, and storing the media information therein, and selecting media information which is read and stored at one out of positions at which the data patterns are successively detected.

Preferably, the recording media includes a LightScribe disc, the data pattern is an index mark, and an area in which the data pattern is detected is a control feature outer ring area.

Preferably, the predetermined interval is set such that three positions or more of the plurality of positions are located at the control feature outer ring area, preferably, equal to or less than 250 µm.

Preferably, when the predetermined interval is between 150 µm~250 µm, a determination is made as to whether the data pattern is detected, and media information is read and stored therein, only at from a first position in which the data pattern is firstly detected to three positions, including the first position, following the first position.

Preferably, when the data pattern is successively detected at (2n−1) positions, the n-th position is selected. Also, when the data pattern is successively detected at 2n positions, a center position between the first and the last position is selected.

Preferably, the data pattern is detected, while a pickup is moved from the innermost position of the plurality of positions to the outermost position in the radial direction of the recording media, or vise versa.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein.

DETAILED DESCRIPTION OF PREFERRED EMBODIMENTS

Figure 1:
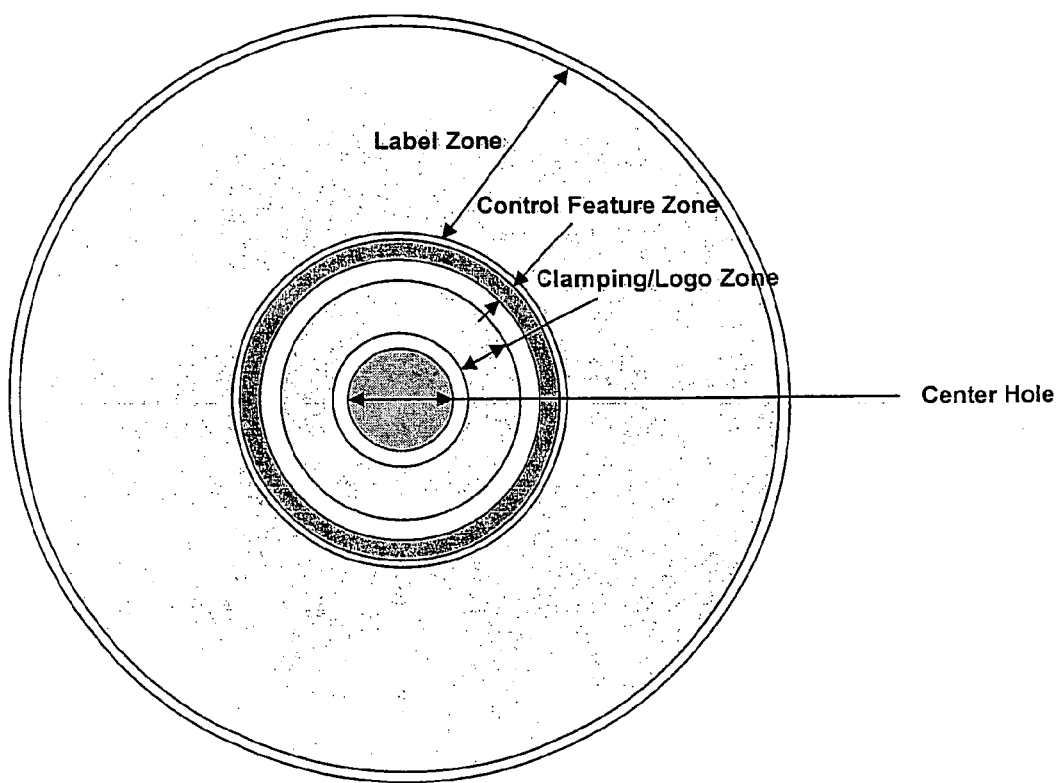
FIG. 1 illustrates a layout of a label side of an exemplary recording medium.
Figure 2:
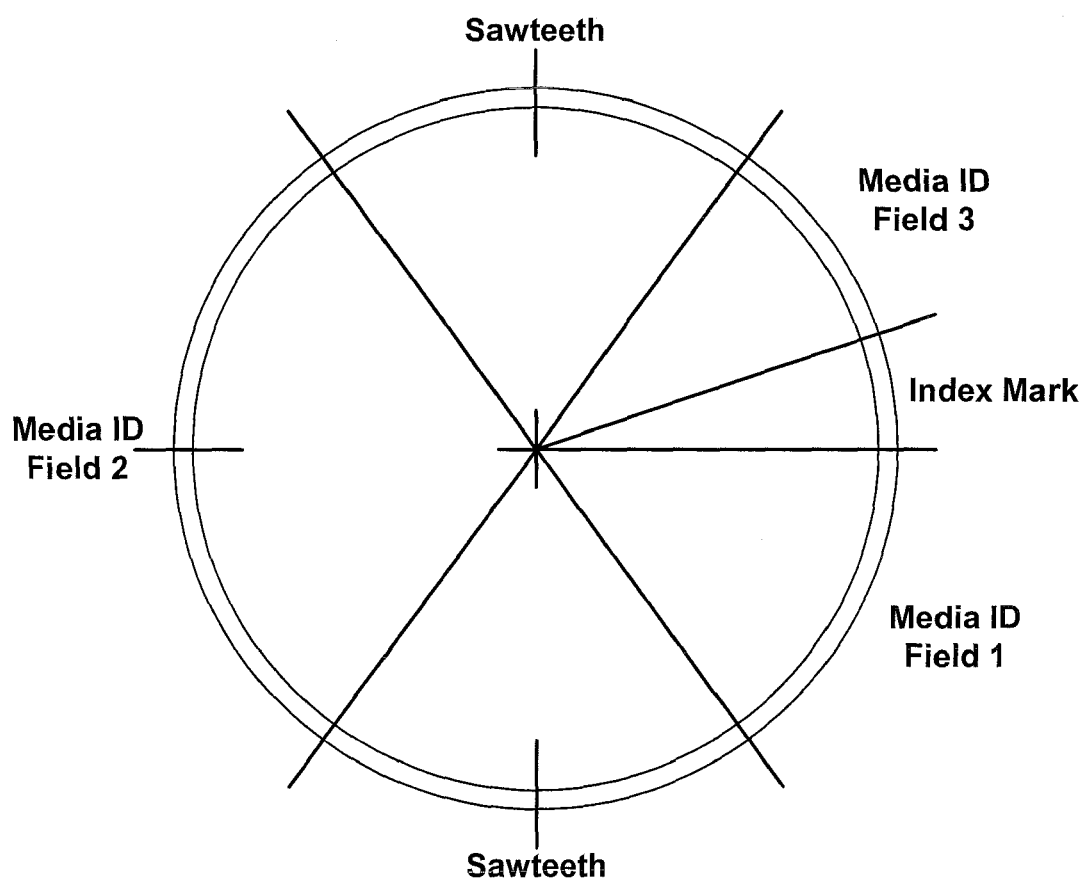
FIG. 2 illustrates a control feature outer ring area located in a control feature zone of the exemplary recording medium shown in FIG. 1.
Figure 3:
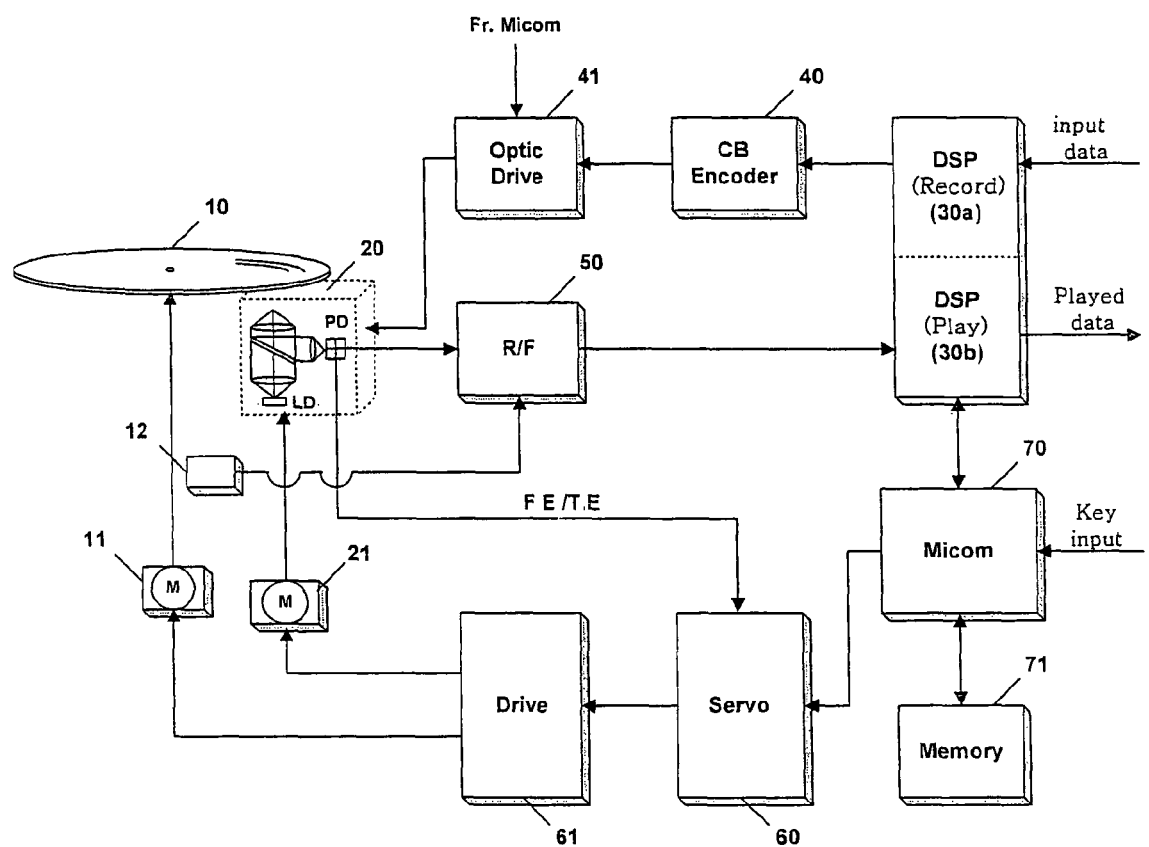
FIG. 3 is a schematic block diagram of an exemplary optical recording media device in which a method for reading media information from optical recording media in accordance with an embodiment of the invention may be implemented.

FIG. 3 is a schematic block diagram of an optical recording media device in which a method for reading media information from optical recording media in accordance with an embodiment of the invention may be implemented. The optical recording media device includes a recording digital signal processor 30a that receives digital data and converts it to a recording format; a channel bit encoder 40 that receives data in the recording format and converts it to a bit stream; an optical driver 41 that outputs a light amount driving signal based on a signal input thereto; an optical pick-up 20 that records data on an optical recording medium 10 based on the light amount driving signal, and detects data from a recording surface of the recording medium 10; a radio frequency (R/F) unit 50 for filtering and wave-forming signals detected by the optical pick-up 20 and outputting the filtered and waveformed signals as a binary signal; a driving unit 61 for driving a spindle motor 11 which rotates the optical recording medium 10; a sled motor 21 which moves the optical pick-up 20; a servo 60 for controlling the driving unit 61 based on a tracking error signal TE and a focus error signal FE output by the optical pick-up 20 and rotation speed of the optical recording medium 10; a digital play signal processor 30b that restores the binary signal to the original data using its own clocks which are synchronous to a phase of the binary signal; a memory 71 for storing media information such as a media ID; and a microcomputer 70 for reading media information from the optical recording medium 10 mounted on a disc driver, storing the read media information in the memory 71 and transmitting the media information to an external host, and controlling and performing a requested recording or playback operation.

If the optical recording media device is capable of performing a label printing operation, the optical recording media device also includes a spoke detector 12 that detects a spoke of a speed control feature area of an optical recording medium 10 that includes a label surface, such as, for example, the LightScribe disc discussed above. More particularly, based on the signal output by the spoke detector 12, the device may determine if the inserted disc 10 includes a label surface such as, for example, the LightScribe disc discussed above, and may also control the rotation speed of the disc 10.

Figure 4:
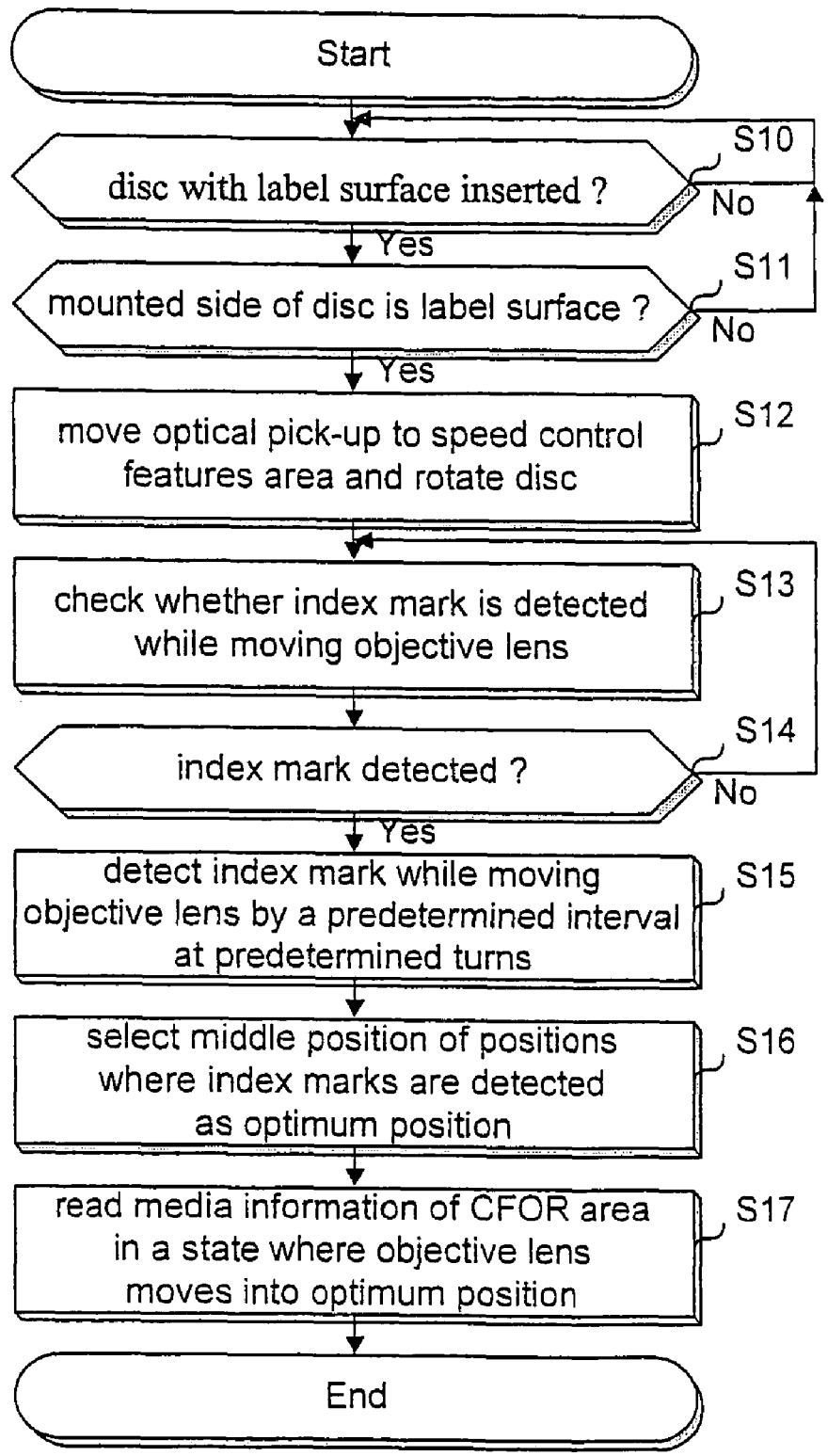
FIG. 4 is a flowchart of a method for reading media information from optical recording media in accordance with an embodiment of the invention.
Figure 5:
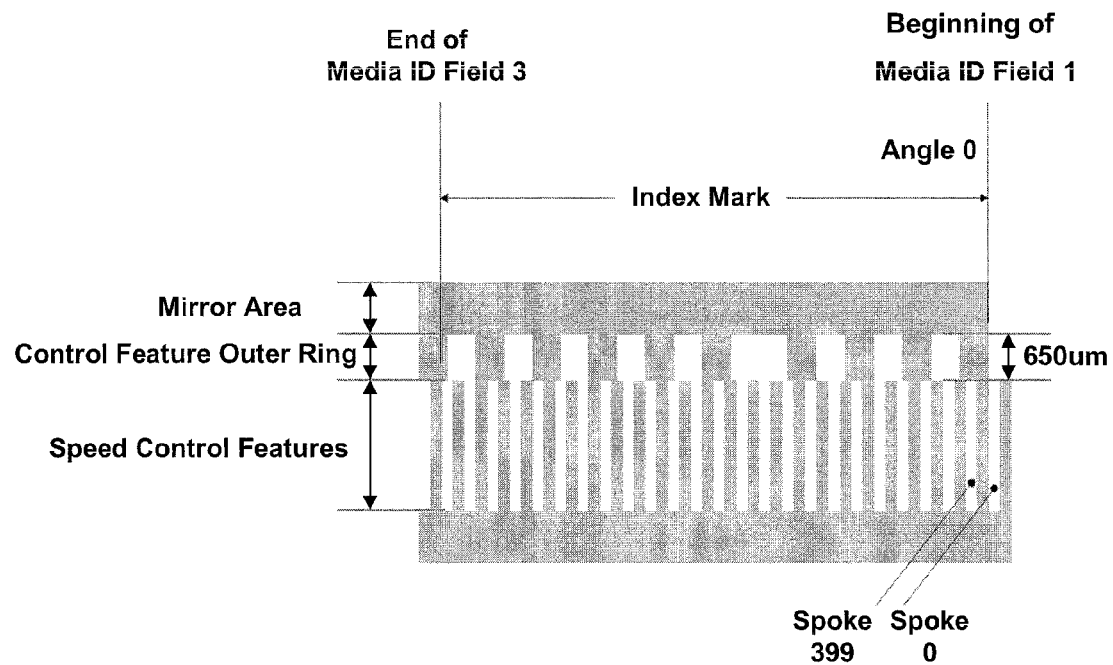
FIG. 5 illustrates a layout of a control feature zone and index mark pattern of the exemplary recording medium shown in FIG. 1.

FIG. 4 is a flowchart of a method for reading media information from optical recording media in accordance with an embodiment of the invention, and will described in detail below with reference also to FIG. 3. FIG. 5 illustrates a layout of a control feature zone, including a mirror area, a control feature outer ring (CFOR) area, a speed control feature area, and an index mark pattern on an optical recording disc as discussed above.

The overall size, or width, of the CFOR area shown in FIG. 5 is approximately 650 μm. A width of 650 μm, and corresponding center area size of 350 μm and outer and inner circumferences of 150 μm each, are referred to herein simply for ease of discussion. Other overall and relative sizes for these areas may also be appropriate. If there is an eccentricity component present on the disc, the widths of approximately 150 μm from the outer and inner circumferences of the CFOR area surrounding a center area of approximately 350 μm are affected by the eccentricity component while, the center area of 350 μm in the CFOR area is not affected by the eccentricity component. Therefore, the center area of 350 μm is referred to as a stable area, and if an operation for reading out media information is performed at the center area of 350 μm in the CFOR area, the media information can be stably read, while reading media information from the inner and outer areas of 150 μm may result in some instability. Thus, if index marks can be detected at three positions or more which are spaced substantially the same distance apart, and the distance is set such that at least one of the positions at which the index marks are detected is located in the stable area, then an operation for reading out media information can be performed in a stable manner.

Figure 6:
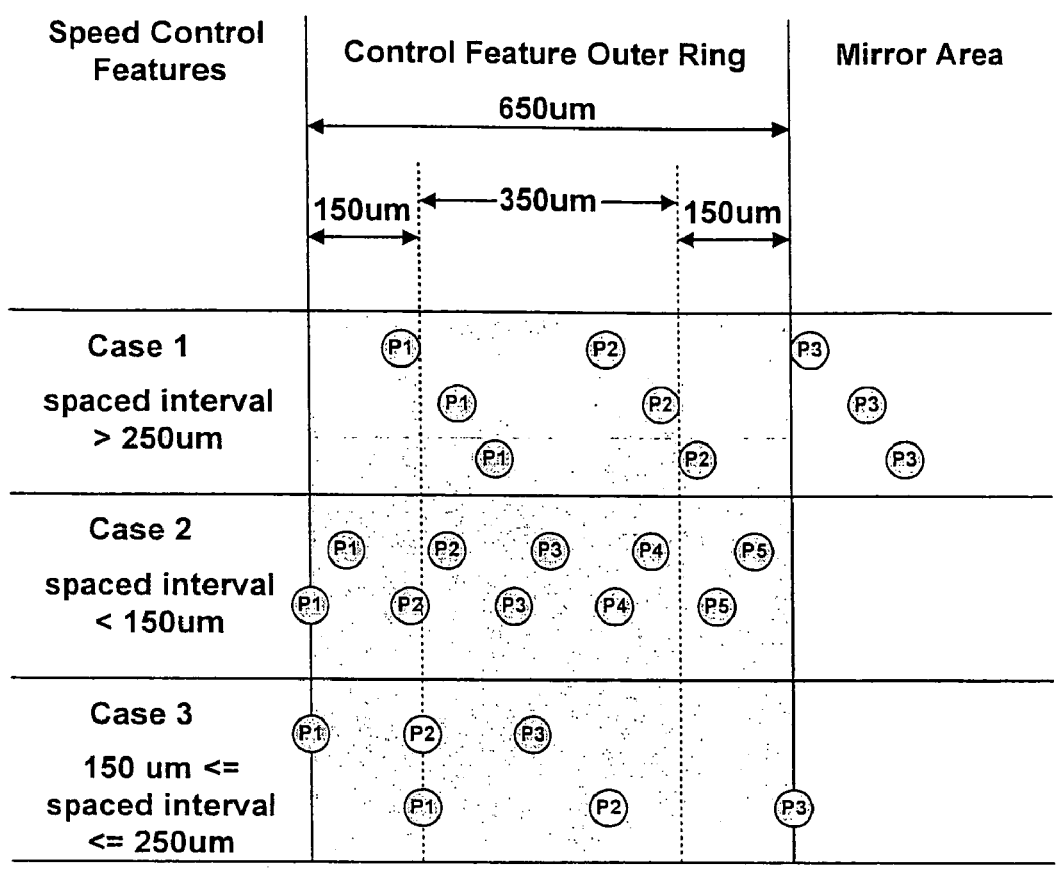
FIG. 6 is a diagrammatic representation of various space intervals used for detecting an index mark.

In the exemplary control feature zone shown in FIG. 5, the width of the CFOR is approximately 650 μm, with a tolerance of eccentricity of approximately 150 μm. Based on this exemplary control feature zone, if the interval between index marks is larger than 250 μm, as shown in FIG. 6 (Case 1), when the first positions P1 are located at a boundary of the inner circumference close to the stable area, index marks at the third positions P3 may fall outside the CFOR and may no be detected. Also, when index marks are detected at only two positions, it is difficult to discern which of the first and second positions is located in the stable area. Therefore, in this case, an upper limit of the interval between index marks may be defined by approximately 250 μm, given a stable area of approximately 350 μm and a tolerance of eccentricity of approximately 150 μm in a CFOR of approximately 650 μm.

Further, the smaller the interval is between index marks, the greater the number of positions to be detected for the index marks. As shown in FIG. 6, if the interval between index marks is less than 150 μm (Case 2), the number of corresponding positions for detecting index marks to locate the stable area can be 5 or more. Therefore, if detection for the index marks is tried at only three positions, then the lower limit for the interval between index marks is 150 μm. Further, if detection for the index marks is tried at only three positions, the distance between index marks should be set between 150 μm and 250 μm (Case 3). In one embodiment of the invention, the interval between index marks may be set to approximately 200 μm.

As shown in FIG. 4, when an optical disc 10 is inserted into an optical recording media device such as the device as shown in FIG. 3, the microcomputer 70 determines whether the inserted optical disc 10 includes a label surface, such as the LightScribe disc discussed above, based on the output signal form the spoke detector 12 in step S10. If it is determined that the disc 10 includes a label surface, the microcomputer 70 moves the optical pick-up 20 to a label area of the optical disc 10, and searches for a peak point of an RF sum to determine if a seated side of the optical disc 10 is a label surface in step S11. If the seated side of the disc 10 is a label surface, the microcomputer 70 moves the optical pick-up 20 to the speed control features area of the label surface, which is typically positioned at the innermost circumference of the optical disc 10, and drives the spindle motor 11 to rotate the optical disc 10 in step S12.

The microcomputer 70 then moves an objective lens (not shown) of the optical pick-up 20 in an outward direction of the optical disc 10 such that the objective lens can enter the CFOR area, and checks whether index marks have been detected in step S13. Here, the microcomputer 70 successively detects positions of the objective lens as it moves from its initial position in the speed control feature area based on driving values of the driving unit 61 and other related parameters.

Figure 7:
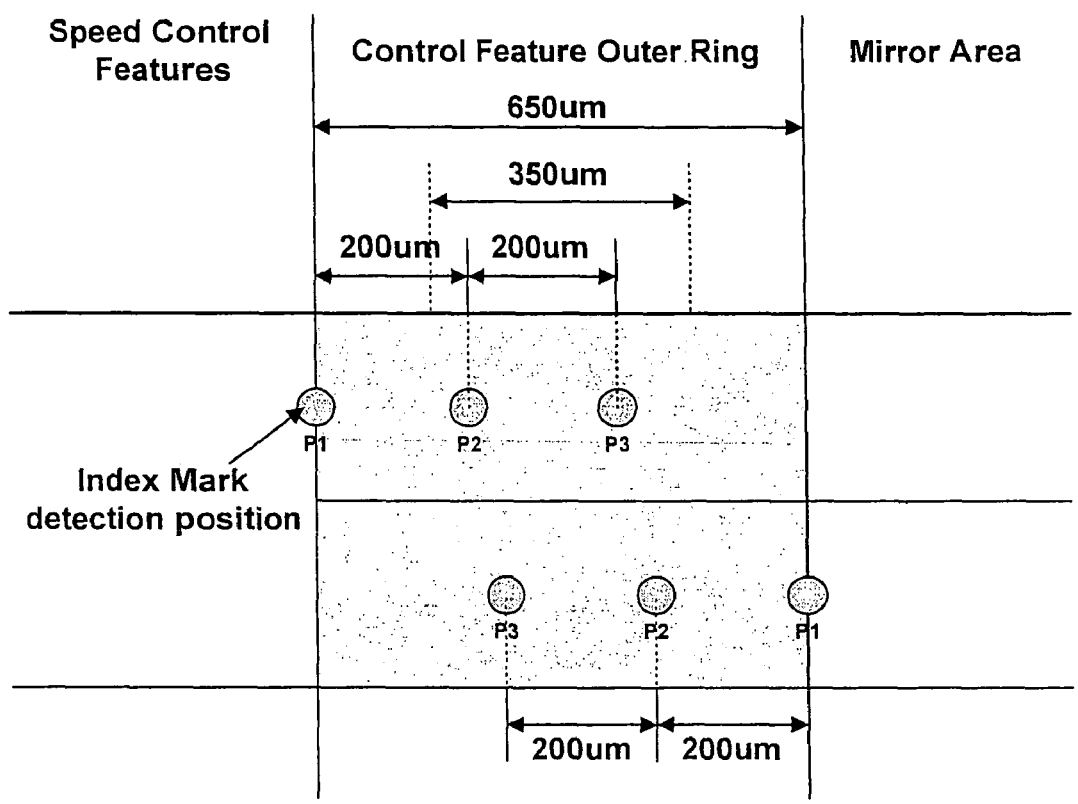
FIG. 7 is a diagrammatic representation of a position for detecting an index mark in a control feature outer ring area in accordance with an embodiment of the invention.

When the first index mark is detected as the objective lens is moved and enters the CFOR area in step S14, the microcomputer 70 moves the objective lens in an outward direction of the disc 10 from the detection position. For example, the objective lens moves from P1 to P7, as shown in FIG. 7, by a predetermined interval to detect an index mark, and then moves in an outward direction, again by a predetermined interval, to P3 to detect an index mark in step S15. For ease of discussion and illustration, a predetermined interval of approximately 200 μm is shown in FIG. 7. However, other intervals may also be appropriate. Since the microcomputer 70 successively detects positions of the objective lens from the initial position, the detection positions P1, P2 and P3 of the index marks can be confirmed.

After successively detecting the index marks at the positions P1, P2 and P3, the microcomputer 70 determines the center of the positions in which the index marks are detected and establishes this center as the optimum position in step S16. For example, the microcomputer selects an n-th position as the optimum position if the index marks are detected at 2n−1 positions. Thus, if the index marks are successively detected at three positions, the microcomputer 70 selects the second position as the optimum position. From the above example, when the index marks are successively detected at seven positions, since the third to fifth positions are in the stable area, a position between the third and the fifth positions may be selected as the optimum position.

Index marks may be detected at 2n positions which are spaced apart at the same predetermined interval in the CFOR area. In this case, if the width of the CFOR area is approximately 650 μm, as in the example discussed above, and n is 2, then the predetermined interval may be set to approximately 150 μm. In this instance, when index marks are successively detected at 2n positions in the CFOR area, or, for example, 4 positions, the microcomputer 70 selects the center position between the first position and the last position as the optimum position. For example, if index marks are successively detected at four positions, since the second and third position are in the stable area, a position between the second and the third positions is selected as the optimum position.

When such an optimum position is selected, the microcomputer 70 moves the objective lens of the optical pick up 20 to the optimum position, and then reads out media information recorded in the CFOR area in step S17. Therefore, although the optical disc 10 may be subject to an eccentricity component, media information can still be stably read from the disc 10, stored in the memory 71, and transmitted to the host. Data transmitted from the host may then be recorded on the label surface of the optical disc 10.

Figure 8:
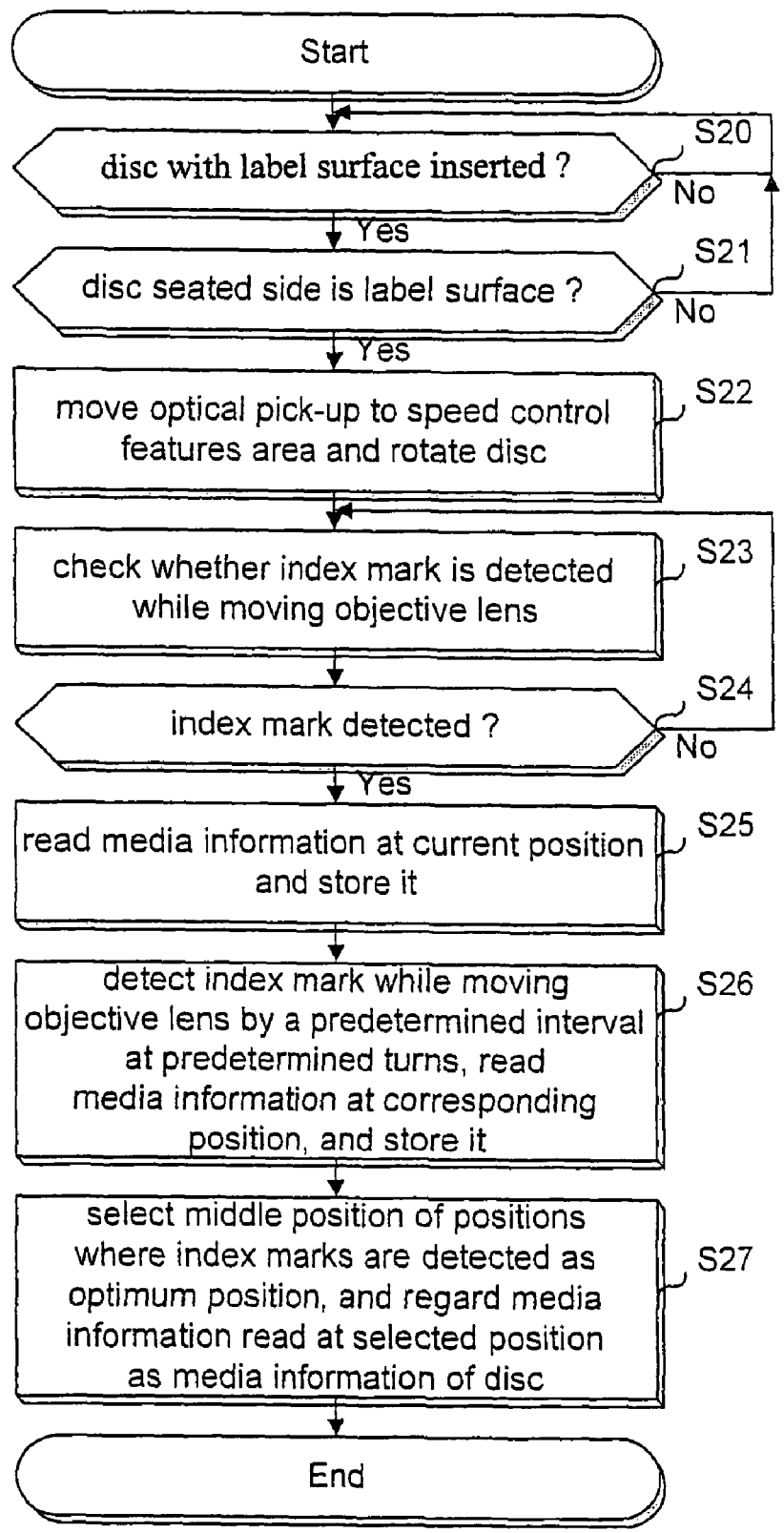
FIG. 8 is a flowchart of a method for reading media information from optical recording media in accordance with an embodiment of the invention.

FIG. 8 is a flowchart of a method for reading media information from optical recording media in accordance with another embodiment of the invention. The method shown in FIG. 8 detects the index marks at 2n−1 positions which are spaced a predetermined distance apart in the CFOR area of the disc 10. In this embodiment, the microcomputer 70 reads out media information from each of the corresponding positions at which the index marks are detected in the CFOR area, and then stores the read information in the memory 71 in steps S20~S26.

Once the index marks are successively detected at 2n−1 positions and corresponding media information has been read from each of the 2n−1 positions and stored, the microcomputer 70 selects the center position from amongst the positions at which the index marks have been detected as the optimum position. The microcomputer 70 then regards media information which was read out from the selected optimum position and stored, as the media information of the inserted optical disc 10 in step S27. As discussed above, the microcomputer 70 selects the n-th position as the optimum position if index marks are detected at 2n−1 positions. The microcomputer 70 then transmits the corresponding media information to the host, and records data transmitted from the host onto a label surface of the optical disc 10.

As set forth above, the methods for reading media information from optical recording media in accordance with embodiments of the invention allow media information to be rapidly and stably read from the recording media, and allow a recording operation to be rapidly and accurately performed on the label surface of the recording media.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of reading medium information on a recording medium, comprising:

setting a plurality of successive radial positions including a first radial position, a second radial position, and a third radial position on the recording medium, wherein the plurality of radial positions are spaced apart from each other by a prescribed distance;

detecting an index mark pattern at the first radial position;

detecting an index mark pattern at the second radial position spaced apart from the first radial position by the prescribed distance;

detecting an index mark pattern at the third radial position spaced apart from the second radial position by the prescribed distance, wherein the prescribed distance ranges from a first distance to a second distance, the first distance being a width affected by an eccentricity component and the second distance being (a width of a control feature outer ring area−the first distance)/2;

selecting the second radial position between the first radial position and the third radial position, wherein the selected second radial position corresponds to a radial position located between an innermost radial position and an outermost radial position of the plurality of radial positions at which index mark patterns are detected; and obtaining medium information at the selected second radial position.

2. The method of claim 1, wherein the second radial position is located substantially at a middle position between the innermost and outermost radial positions at which index mark patterns are located.

3. The method of claim 2, wherein the number of successive radial positions that include index mark patterns within the control feature outer ring area is greater than 2.

4. The method of claim 2, wherein the number of successive radial positions within the control feature outer ring area is 3.

5. The method of claim 1, wherein the second radial position is located substantially at a middle position of the plurality of radial positions if there is an odd number of radial positions at which index mark patterns are located.

6. The method of claim 1, wherein the prescribed distance is between 150 µm and 250 µm.

7. The method of claim 6, wherein the recording medium has a printable surface and the index mark patterns corresponding to at least two of the first, second, or third radial positions are wholly provided in the control feature outer ring area.

8. The method of claim 6, wherein each index mark pattern is indicative of a corresponding position on the recording medium.

9. The method of claim 6, wherein obtaining medium information at the selected second radial position comprises obtaining a Media ID that indicates that the recording medium has a printable surface.

10. The method of claim 1, wherein the prescribed distance is at least 150 micrometers.

11. The method of claim 10, wherein the prescribed distance is less than 250 micrometers.

12. The method of claim 11, wherein the prescribed distance is approximately 200 micrometers.

13. The method of claim 1, wherein selecting the second radial position comprises selecting an nth position if there are 2n−1 successive radial positions at which an index mark pattern is located.

14. The method of claim 1, wherein the index mark patterns are detected at the first, second, and third radial positions based on moving an optical pickup from the innermost position of the plurality of radial positions in a radial direction of the recording medium toward the outermost position of the plurality of radial positions.

15. The method of claim 1, wherein the index mark patterns are detected at the first, second, and third radial positions based on moving an optical pickup from the outermost position of the plurality of radial positions in a radial direction of the recording medium toward the innermost position of the plurality of radial positions.

16. The method of claim 1, wherein the index mark patterns at the first, second, and third radial positions are located in the control feature outer ring area of area of the recording medium.

17. The method of claim 1, wherein selecting the second radial position from a plurality of successive radial positions comprises selecting a position between an nth position and an (n+1)th position if the number of successive radial positions at which respective index mark patterns are located is 2n.

18. A method of determining medium information on a recording medium, comprising:
    if an index mark pattern is detected at a first position, detecting an index mark pattern at a second position spaced from the first position by a prescribed distance;
    detecting an index mark pattern at a third position spaced from the second position by the prescribed distance, wherein the prescribed distance ranges from a first distance to a second distance, the first distance being a width affected by an eccentricity component and the second distance being (a width of a control feature outer ring area−the first distance)/2; and
    obtaining medium information at the second position if the index mark patterns are successively detected at the second position and the third position.

19. The method of claim 18, wherein the prescribed distance is between 150 µm and 250 µm.

20. The method of claim 18, wherein the index mark patterns at the first position, the second position and the third position are located in the control feature outer ring area of the recording medium having a printable surface.

21. The method of claim 18, wherein the index mark patterns are indicative of respective positions on the recording medium.

22. The method of claim 18, wherein obtaining medium information at the second position comprises obtaining a Media ID which indicates that the recording medium has a printable surface.

23. The method of claim 18, wherein the prescribed distance is at least 150 micrometers.

24. The method of claim 23, wherein the prescribed distance is less than 250 micrometers.

25. The method of claim 24, wherein the prescribed distance is approximately 200 micrometers.

\* \* \* \* \*